(12) United States Patent
Friesen

(10) Patent No.: US 10,577,198 B2
(45) Date of Patent: Mar. 3, 2020

(54) PORTABLE DRIVE-OVER CONVEYOR FOR DISCHARGING PARTICULATE MATERIAL AT A HEIGHT SUITABLE FOR FILLING A SILO

(71) Applicant: Hi-Crush Canada Inc., Houston, TX (US)

(72) Inventor: Henry Friesen, Winkler (CA)

(73) Assignee: Hi-Crush Canada Inc., Houston, TX (US)

( * ) Notice: Subject to any disclaimer, the term of this patent is extended or adjusted under 35 U.S.C. 154(b) by 146 days.

(21) Appl. No.: 15/802,740

(22) Filed: Nov. 3, 2017

(65) Prior Publication Data

US 2019/0016546 A1 Jan. 17, 2019

Related U.S. Application Data

(60) Provisional application No. 62/533,221, filed on Jul. 17, 2017.

(51) Int. Cl.
*B65G 65/42* (2006.01)
*B60P 1/36* (2006.01)

(52) U.S. Cl.
CPC ............... *B65G 65/42* (2013.01); *B60P 1/36* (2013.01)

(58) Field of Classification Search
CPC .. B60D 1/01; B60D 1/015; B60P 1/36; B65G 41/005; B65G 41/002; B65G 41/008; B65G 65/06; B65G 17/16; B65G 67/24; B65G 67/08; B61D 47/00
USPC ........................................................ 414/528
See application file for complete search history.

(56) References Cited

U.S. PATENT DOCUMENTS

| 3,638,816 | A | * | 2/1972 | Mann | B65G 41/002 |
|---|---|---|---|---|---|
| | | | | | 414/504 |
| 5,964,566 | A | * | 10/1999 | Stewart | B65G 67/24 |
| | | | | | 198/302 |
| 7,540,700 | B2 | * | 6/2009 | Hook | A01D 90/10 |
| | | | | | 414/503 |
| 8,573,917 | B2 | * | 11/2013 | Renyer | A01C 15/003 |
| | | | | | 414/523 |
| 8,584,827 | B1 | * | 11/2013 | Jesse | B65G 33/14 |
| | | | | | 198/315 |
| 9,828,184 | B1 | * | 11/2017 | Bynum | B65G 41/005 |
| 2003/0170103 | A1 | * | 9/2003 | Mast | B65G 47/18 |
| | | | | | 414/537 |
| 2013/0233682 | A1 | * | 9/2013 | Werlinger | B65G 21/10 |
| | | | | | 198/861.2 |
| 2016/0052732 | A1 | * | 2/2016 | Toews | B65G 47/18 |
| | | | | | 198/302 |

(Continued)

*Primary Examiner* — Glenn F Myers
(74) *Attorney, Agent, or Firm* — Baker Botts L.L.P.

(57) ABSTRACT

A portable drive-over conveyor for unloading particulate material from trucks features a towable trailer supporting a conveyor system having two stages, each transferring the unloaded material in opposite directions along a length of the trailer so as to progressively elevate the particulate material to a suitable height above the ground for discharging from the portable drive-over conveyor. A first stage of the conveyor system transfers the material in one direction from an inlet of the conveyor system to a transfer discharge, whereat the unloaded material is transferred to the second stage transferring the material in an opposite direction to a discharge of the overall conveyor system which is located at a higher elevation than the transfer discharge.

21 Claims, 13 Drawing Sheets

(56) References Cited

U.S. PATENT DOCUMENTS

2016/0221761 A1\* 8/2016 Walder ................. B65G 17/126
2017/0327024 A1\* 11/2017 Ozinga ................. B65G 21/10

\* cited by examiner

FIG 8

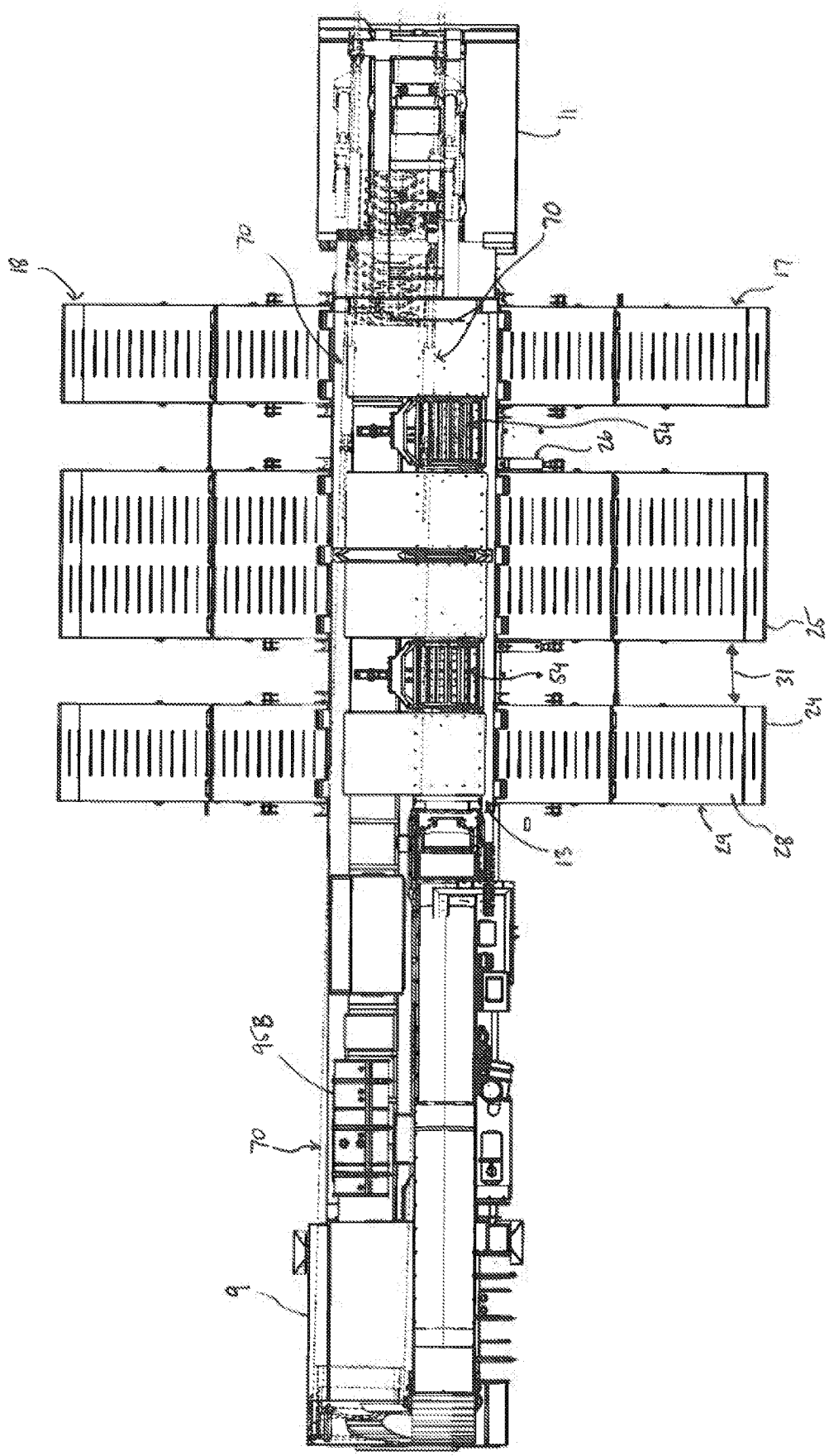

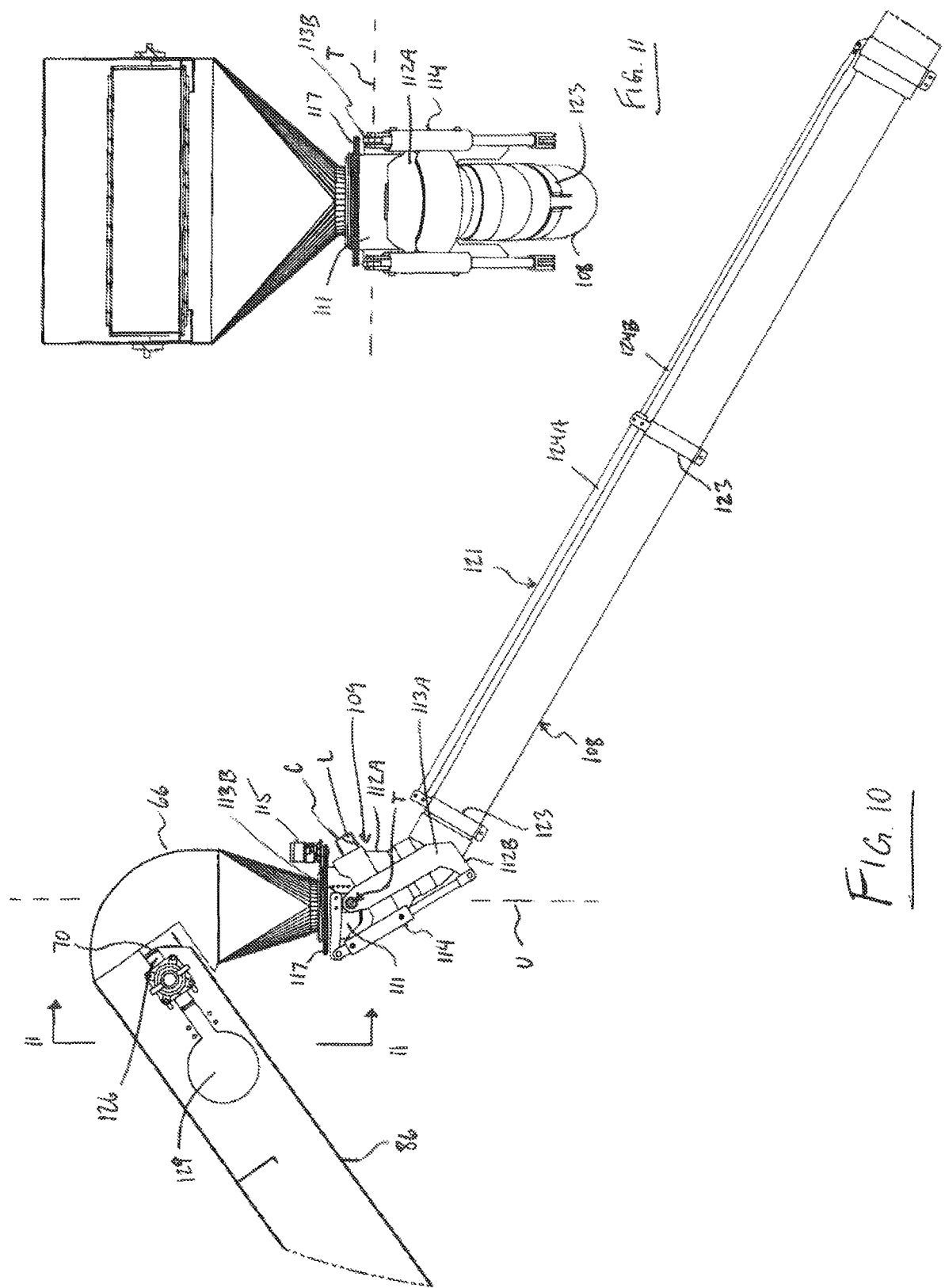

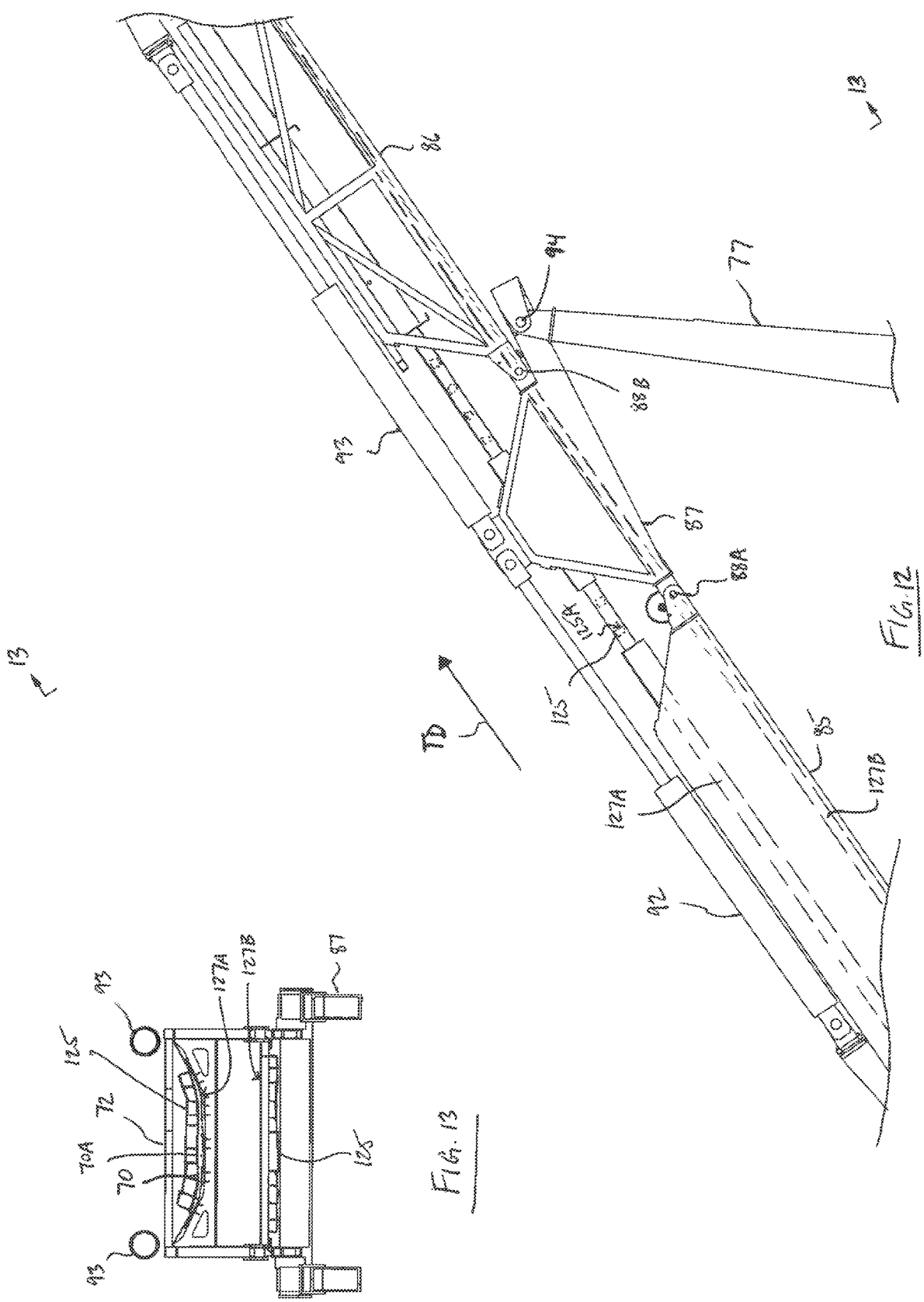

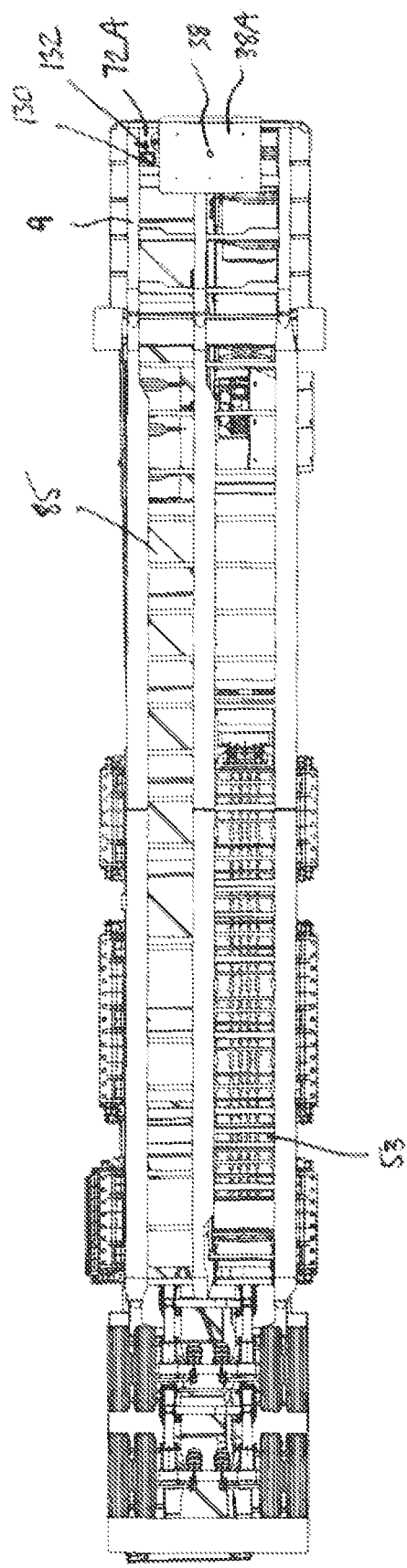

PORTABLE DRIVE-OVER CONVEYOR FOR DISCHARGING PARTICULATE MATERIAL AT A HEIGHT SUITABLE FOR FILLING A SILO

This application claims benefit under 35 U.S.C. 119(e) of U.S. Provisional Application Ser. No. 62/533,221 filed Jul. 17, 2017.

FIELD OF THE INVENTION

The present invention relates to apparatuses for transferring particulate material, and more specifically to portable drive-over conveyors for transferring particulate material transported by a truck off the truck to a desired location using multiple conveyors to progressively elevate the material from an initial intake to the desired discharge height.

BACKGROUND

A number of portable drive-over conveyors are presently provided by various manufacturers which can be used to unload a dump truck of its particulate material contents, for example aggregate.

Many such commercially available units, which are portable so that they may be moved from one site to another as needed, may not be able on their own to facilitate transfer of the particulate material directly off the truck and into a silo which is typically in the order of 30 to 50 feet tall. In such a case, another separate conveyor system such as a stacking conveyor may be required in conjunction to the drive-over conveyor in order to complete the transfer of the particulate material from the truck on which it was transported to the storage silo where it is contained until needed for use, for example in a fracking operation.

SUMMARY OF THE INVENTION

According to an aspect of the invention there is provided a portable drive-over conveyor for unloading particulate material from a transport vehicle comprising:

a transportable frame extending in a longitudinal direction from a forward end of the transportable frame to a rear end thereof and having first and second sides of the transportable frame spanning therebetween;

a hitch coupling connected to the transportable frame for connection of the transportable frame to a tow vehicle and a plurality of wheels rotatably coupled to the transportable frame for supporting the transportable frame in rolling movement across a support surface, such that the transportable frame is towable across the support surface;

first and second ramp assemblies respectively connected to the first and second sides of the transportable frame and extending laterally outwardly therefrom in an operating position of the first and second ramp assemblies in which the first and second ramp assemblies respectively provide an inclined upper surface extending downwardly from a height of an upper surface defined on the transportable frame to a respective distal end of the respective one of the first and second ramp assemblies so that a wheel of the transport vehicle can move from the support surface to the upper surface of the transportable frame;

a feeder conveyor carried by the transportable frame with an intake of the feeder conveyor located below the upper surface of the transportable frame;

an opening in the upper surface of the transportable frame to allow passage of the material from a discharge of the transport vehicle through the opening in the upper surface of the transportable frame and to the feeder conveyor, the opening being located in a vehicle discharge area of the transportable frame adapted for supporting the transport vehicle in movement across the upper surface of the transportable frame;

the feeder conveyor including a discharge of the feeder conveyor spaced in a first longitudinal direction from the intake of the feeder conveyor and located within a periphery of the transportable frame collectively defined by the forward end and the rear end and the first and second sides, the feeder conveyor being operable to convey the material in the first longitudinal direction along the transportable frame once discharged from the transport vehicle;

a main conveyor carried by the transportable frame with an intake of the main conveyor located in communication with the discharge of the feeder conveyor so as to receive the material conveyed by the feeder conveyor;

the main conveyor including a discharge of the main conveyor which in an operating position of the main conveyor is elevated above the intake of the feeder conveyor and spaced therefrom in a second longitudinal direction opposite to the first longitudinal direction, the main conveyor being inclined upwardly and in the second longitudinal direction from the intake of the main conveyor to the discharge thereof and operable to convey the material along the transportable frame in the second longitudinal direction once received from the feeder conveyor;

at least a portion of the main conveyor which extends from the intake of the main conveyor towards the discharge thereof being located vertically above the vehicle-discharge area of the transportable frame at a height adapted to allow passage of the transport vehicle under the main conveyor.

According to an aspect of the invention there is provided a portable drive-over conveyor for unloading particulate material from a truck comprising:

a trailer with front and rear ends longitudinally opposite one another and first and second sides;

the trailer including a hitch coupling supported at the front end for coupling to a towing vehicle;

the trailer including a plurality of wheels rotatably coupled in proximity to the rear end such that the trailer is towable across a support surface by the towing vehicle;

a conveyor system carried by the trailer for transferring the particulate material received from a truck to a discharge of the conveyor system wherefrom the particulate material exits the portable drive-over conveyor so as to be transferred to an outside location with respect to the portable drive-over conveyor;

a first ramp assembly mounted on the first side for pivotal movement about an axis longitudinal of the first side such that the first ramp assembly is positionable in a manner extending outwardly from the first side to define a ramp allowing a truck wheel to move onto the trailer from another surface;

a second ramp assembly mounted on the second side for pivotal movement about an axis longitudinal of the second side such that the second ramp assembly is positionable in a manner extending outwardly from the second side to define a ramp allowing a truck wheel to move onto the trailer from another surface;

the ramp assemblies and the trailer providing upper surfaces for supporting the truck as it passes from the first ramp assembly over the trailer and onto the second ramp assembly;

the conveyor system including a first conveyor assembly having an intake beneath the upper surface of the trailer such that the upper surface of the trailer includes an inlet for passage of the particulate material discharged thereon through the upper surface to the first conveyor assembly;

the first conveyor assembly extending from the intake in a direction from one end of the trailer towards the other to a transfer discharge of the first conveyor assembly so that the particulate material is conveyed in a first direction therealong;

the conveyor system including a second conveyor assembly with an intake arranged at the transfer discharge of the first conveyor assembly so as to receive the particulate material therefrom, the second conveyor assembly extending from its intake in a second direction opposite to the first direction and upwardly to a discharge defining the discharge of the conveyor system which is located at a higher elevation than the transfer discharge of the first conveyor assembly.

This drive-over conveyor provides one self-contained portable unit which can transfer particulate material unloaded from a truck to a relatively tall storage or containment structure such as a silo which often stands relatively tall, in the order of tens of feet.

To be able to move the particulate material to a suitable height wherefrom the material can then be discharged into a fill opening of such a storage structure, a system of conveyors is provided each of which elevates the material to a higher elevation while doing so at an incline to the respective conveyor at which the particulate material can be suitably carried upwardly along the conveyor. That is, too steep an incline to a conveyor may not provide suitable conveyance of particulate matter such as sand.

Thus the conveyors of the system act to move the material in opposite directions along the length of the trailer so as to be able to progressively elevate the unloaded material with each one of the conveyors to transport it to the prescribed discharge height.

Typically the first conveyor assembly extends both in the first direction and upwardly to the transfer discharge which is located at a higher elevation than the intake of the first conveyor assembly.

In one arrangement the first conveyor assembly is driven to transfer the particulate material towards the front end of the trailer, and the second conveyor assembly is driven to transfer the particulate material towards the rear end of the trailer.

Preferably the hitch coupling comprises a king pin depending from a cantilevered platform extending forwardly from the front end of the trailer.

In such an arrangement where the second conveyor assembly is driven to transfer the particulate material towards the rear end of the trailer, the intake of the second conveyor assembly is located on the platform.

Typically the first conveyor assembly and the second conveyor assembly are located in side-by-side relation.

In one arrangement, the inlet to the first conveyor assembly is offset from a transverse center of the trailer so as to be located closer to one of the first and second sides than to the other.

Preferably the second conveyor assembly is supported on the trailer so as to be retractable from an operating position in which it is inclined relative to the trailer with the discharge of the conveyor system spaced at a height above the trailer to a stored position in which the second conveyor assembly is substantially horizontal with the discharge at an elevation substantially equal to the trailer.

Thus the conveyor can be arranged so that the portable drive-over conveyor meets roadway transport height requirements.

Preferably the second conveyor assembly comprises a folding conveyor with a first section supported on the trailer, an intermediary section pivotally connected to the first section, and a second section pivotally connected to the intermediary section for pivotal movement between a folded position in which the second section lies over on top of the first section with its end distal to connection with the intermediary section located between opposite ends of the first section, and a deployed position in which the intermediary section and the second section form a continuation of the first section extending therebeyond generally in a common direction.

A second conveyor assembly of the folding type may meet both the roadway transport requirements including height and length of trailer, and prescribed height of the conveyor discharge which is preferably in the order of tens of feet commensurate with a storage silo.

Preferably the conveyor system is substantially enclosed around its transverse periphery encircling a respective direction of material transfer so as to contain dust generated during transferring of the particulate material. This may reduce risk of silicosis in operators or other workers in the vicinity of the portable drive-over conveyor during use.

Preferably the second conveyor assembly is supported at a height over the upper surface of the trailer, where the inlet to the first conveyor assembly is located, at least substantially equal to a height of the truck so as to enable the truck to move from the support surface across one of the ramp assemblies and onto the trailer, under the second conveyor assembly, for unloading.

As such, a truck can be gradually unloaded while the conveyor is simultaneously operated to transfer the particulate material from the conveyor intake to the outside location which is typically horizontally beyond the trailer.

In one arrangement the second conveyor assembly is supported by scissor-style linkage at the rear end of the trailer.

Thus the second conveyor assembly is supported to the front of and to the rear of the inlets located centrally of the trailer.

There may be a plurality of inlets in the upper surface of the trailer such that more than one truck can be simultaneously positioned each over one of the inlets for unloading.

In one arrangement the second conveyor assembly is inclined in the second direction and upwardly at a prescribed angle relative to the horizontal in a range between 25 degrees and 45 degrees, or in another range between 30 degrees and 40 degrees. Thus, in such arrangements the second conveyor assembly is inclined at an acute angle relative to the trailer and to the horizontal.

In one arrangement the discharge of the conveyor system is located at a prescribed height above the support surface which is in a range between 60 and 75 feet, or in another range between 65 and 70 feet.

The portable drive-over conveyor may further include a chute at the discharge of the conveyor system for guiding the particulate material by gravity away therefrom to a desired outside location. Preferably, the chute is pivotally attached to the second conveyor assembly so that an end of the chute distal to the conveyor system is positionable angularly of a radial direction of the second conveyor assembly. Thus, the chute is movable relative to the discharge of the conveyor as if the interconnection were a ball and socket joint, and as such the discharge end of the chute can be positioned longitudinally inwardly of the conveyor discharge (so as to discharge closer to the trailer) or to either side of the second conveyor assembly.

The chute may be carried on an annular track encompassing an opening of the discharge of the conveyor system for rotational movement of the chute relative to the discharge in a manner so that transfer of material from the discharge to the chute is not obstructed.

Additionally, the chute may be supported on a first support framework pivotally connected to a second support framework attached to the second conveyor assembly to define an axis transverse to a longitudinal direction of the second conveyor assembly about which the chute is driven in pivotal movement to raise and lower the distal end of the chute.

The portable drive-over conveyor may further include a camera located in the vicinity of the discharge of the conveyor system configured for generating visual images of the distal end of the discharge chute wherefrom the material exits by gravity. Preferably a lens of the camera is configured to follow movement of the distal discharge chute end. In one arrangement the camera is mounted on an outer surface of the discharge chute so as to be movable therewith and is oriented thereon to provide the visual images of the distal discharge chute end. Preferably the camera is operatively connected to a monitor mounted on the trailer so that an operator located at ground level can view the visual images of the distal discharge chute end in order to position the distal end of the discharge chute at a desired location.

The portable drive-over conveyor may further include an overfill dump gate operable to move from a closed position covering an opening formed in an underside portion of an enclosure of the second conveyor assembly at or adjacent a lower end thereof near the intake of the second conveyor assembly, to an open position relative to the opening so as to allow material collected at the lower end of the second conveyor assembly below the intake to be released from the enclosure of the second conveyor assembly. This may prevent damage to the second conveyor assembly in the event the discharge of the second conveyor assembly becomes obstructed causing material to move along a lower run of the second conveyor assembly back towards the intake.

According to a further aspect of the invention there is provided a portable drive-over conveyor for unloading particulate material from a transport vehicle comprising:

a transportable frame extending in a longitudinal direction from a forward end of the transportable frame to a rear end thereof and having first and second sides of the transportable frame spanning therebetween;

a hitch coupling connected to the transportable frame for connection of the transportable frame to a tow vehicle and a plurality of wheels rotatably coupled to the transportable frame for supporting the transportable frame in rolling movement across a support surface, such that the transportable frame is towable across the support surface;

first and second ramp assemblies respectively connected to the first and second sides of the transportable frame and extending laterally outwardly therefrom in an operating position of the first and second ramp assemblies in which the first and second ramp assemblies respectively provide an inclined upper surface extending downwardly from a height of an upper surface defined on the transportable frame to a respective distal end of the respective one of the first and second ramp assemblies so that a wheel of the transport vehicle can move from the support surface to the upper surface of the transportable frame;

a feeder conveyor carried by the transportable frame with an intake of the feeder conveyor located below the upper surface of the transportable frame;

an opening in the upper surface of the transportable frame to allow passage of the material from a discharge of the transport vehicle through the opening in the upper surface of the transportable frame and to the feeder conveyor, the opening being located in a vehicle discharge area of the transportable frame adapted for supporting the transport vehicle in movement across the upper surface of the transportable frame;

the feeder conveyor being operable to convey the material discharged from the transport vehicle to a discharge of the feeder conveyor which is spaced in a longitudinal direction, with respect to the transportable frame, from the intake of the feeder conveyor;

a main conveyor carried by the transportable frame with an intake of the main conveyor located in communication with the discharge of the feeder conveyor so as to receive the material conveyed by the feeder conveyor;

the main conveyor being operable to convey the material once received from the feeder conveyor to a discharge of the main conveyor which in an operating position of the main conveyor is elevated above the intake of the feeder conveyor;

the main conveyor, in the operating position, extending upwardly and in a longitudinal direction of the transportable frame from the intake of the main conveyor to the discharge thereof such that the main conveyor is inclined in the operating position;

the main conveyor comprising a folding conveyor including a first section defining the intake of the main conveyor, a second section pivotally connected to the first section at a first pivot joint defining a pivot axis transversely oriented with respect to the transportable frame, and a third section defining the discharge of the main conveyor, the third section being pivotally connected to the second section at a second pivot joint defining a pivot axis transversely oriented with respect to the transportable frame, such that the second and third sections are movable relative to the first section by actuators operatively coupled to the second and third sections from the operating position in which the first, second, and third sections are disposed so that the material is transferable from the intake of the main conveyor along each one of the sections to the discharge of the main conveyor to a folded condition of the folding conveyor in which the third section is disposed substantially overlying the first section;

the folding conveyor including a common endless conveyor belt wrapping around a plurality of rollers one of which is connected to the first section and another one of which is connected to the third section so as to be arranged to span from the first section across the second section to the third section of the folding conveyor to convey the material in a transfer direction along the main conveyor in the operating position;

the conveyor belt supporting a plurality of upstanding cleats defining leading support surfaces extending transversely from an outer surface of the conveyor belt at spaced locations with respect to the transfer direction of the main conveyor against which the material conveyed by the main conveyor is rested so as to be carried up the incline against gravity.

BRIEF DESCRIPTION OF THE DRAWINGS

The invention will now be described in conjunction with the accompanying drawings in which:

Figure 8:
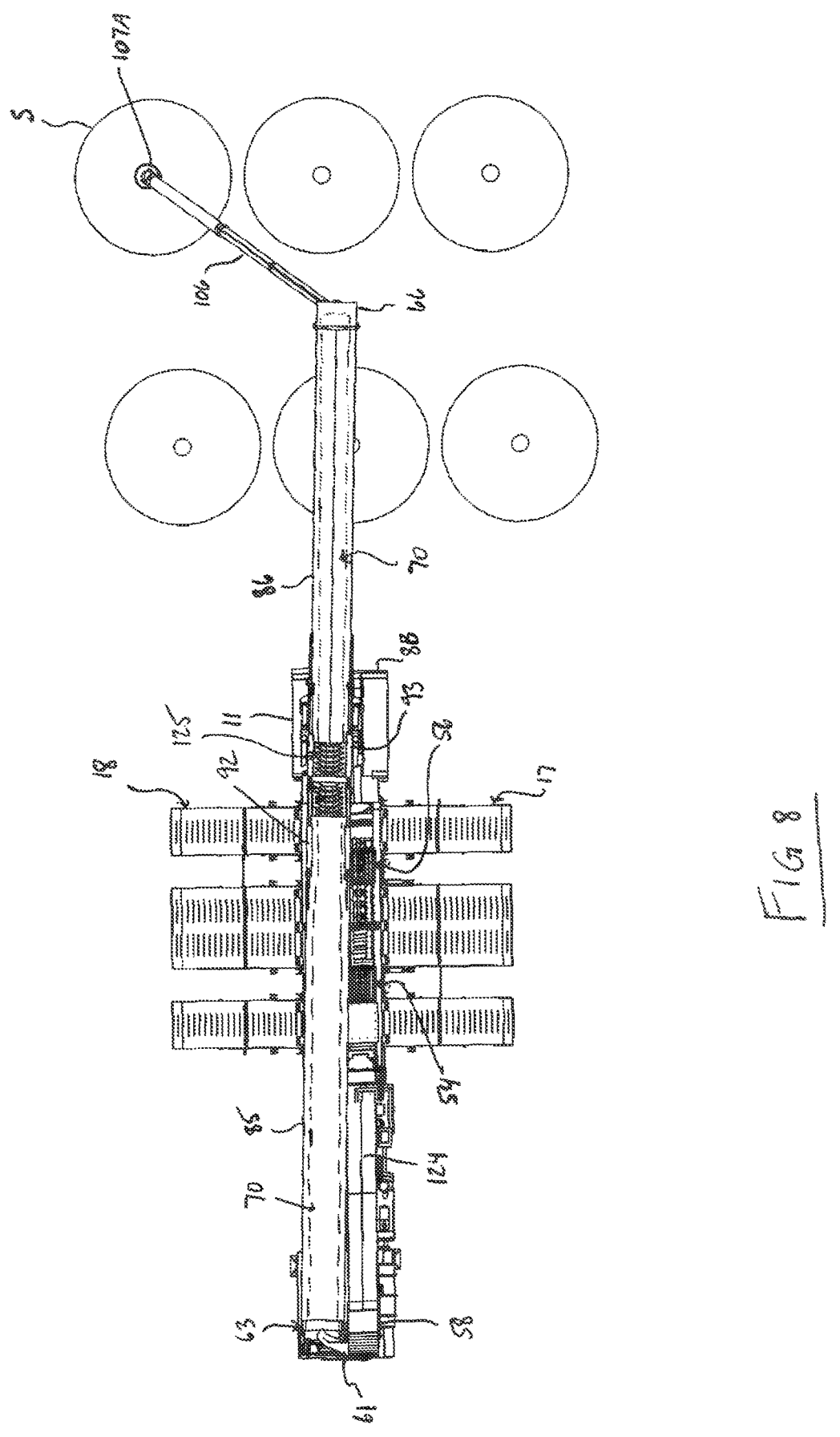

FIG. 8 is a top plan view of the arrangement of FIG. 1 in the operating position including silos which the portable drive-over conveyor can be used to fill. In this figure the conveyor belt of the second conveyor assembly is shown schematically and in phantom.

FIG. 9 is a top plan view of the arrangement of FIG. 1 where the second conveyor assembly is shown in phantom so as to show a top surface of the center frame section.

FIG. 10 is an enlarged partial view, shown in side elevation, of a chute at a discharge of a conveyor system of the arrangement of FIG. 1.

FIG. 11 is a cross-sectional view along line 11-11 in FIG. 10.

FIG. 12 is an enlarged partial view of connections between sections of the second conveyor assembly of the arrangement of FIG. 1.

FIG. 13 is a cross-sectional view along line 13-13 in FIG. 12.

FIG. 15 is a bottom plan view of the arrangement of portable drive-over conveyor of FIG. 1 in the transport position.

In the drawings, like characters of reference indicate corresponding parts in the different figures.

DETAILED DESCRIPTION

Figure 1:
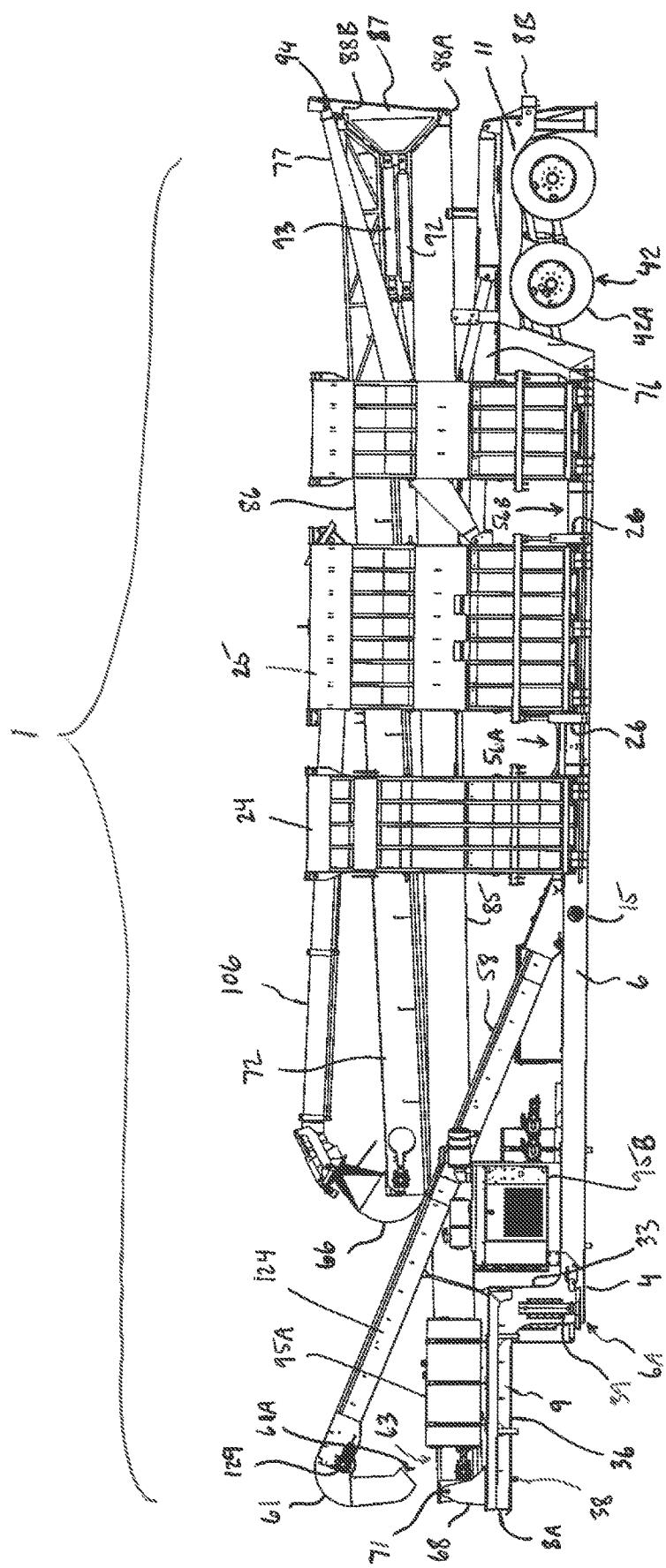
FIG. 1 illustrates in side elevation an arrangement of portable drive-over conveyor according to the present invention which is shown in a transport position. Some components are omitted for clarity of illustration.
Figure 2:
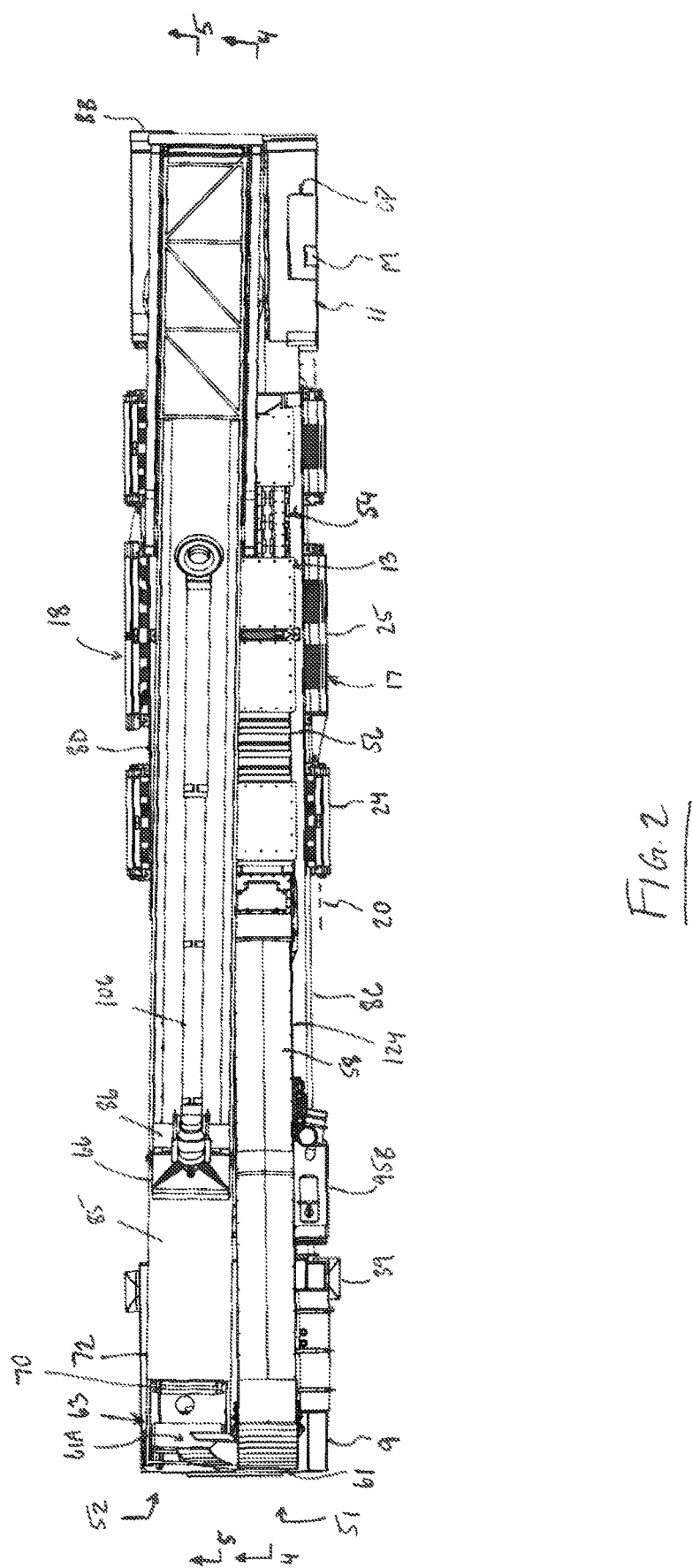
FIG. 2 is a top plan view of the arrangement of portable drive-over conveyor of FIG. 1 in the transport position.
Figure 3:
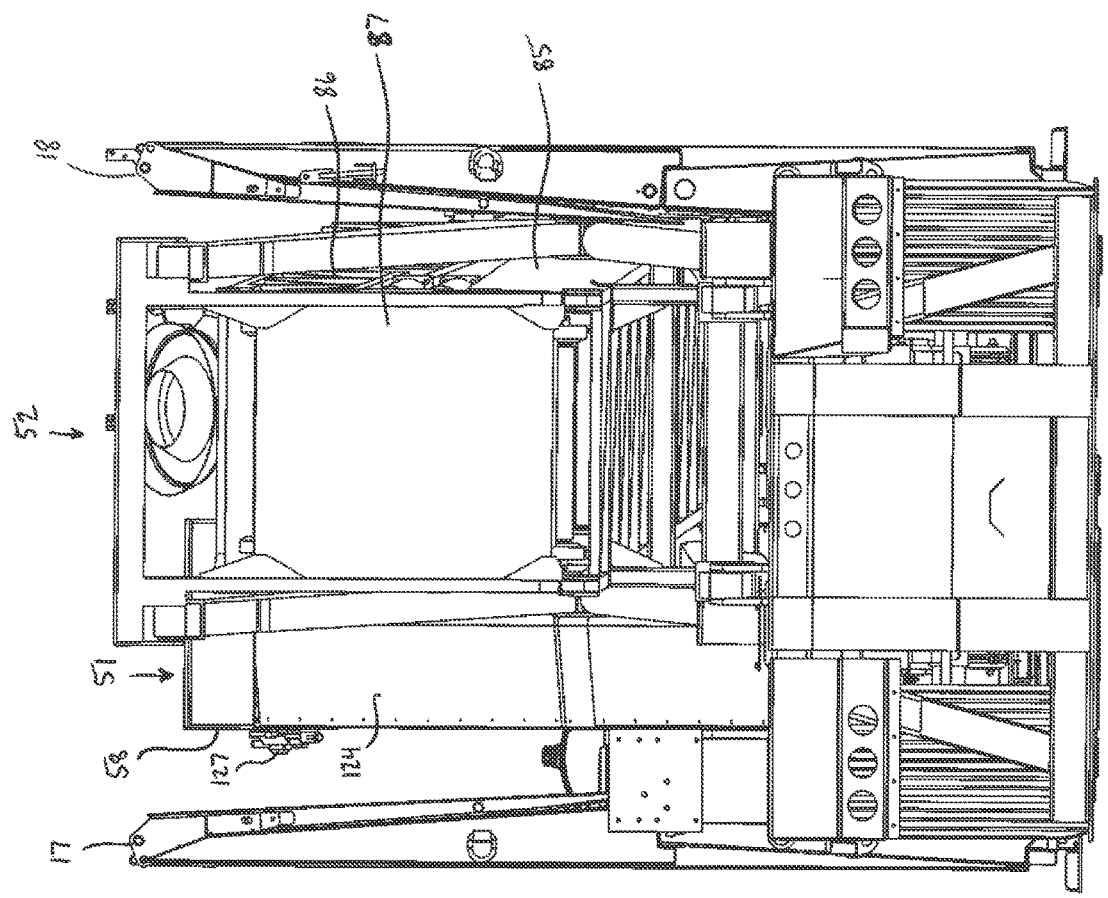
FIG. 3 is a rear elevational view of the arrangement of portable drive-over conveyor of FIG. 1 in the transport position.
Figure 4:
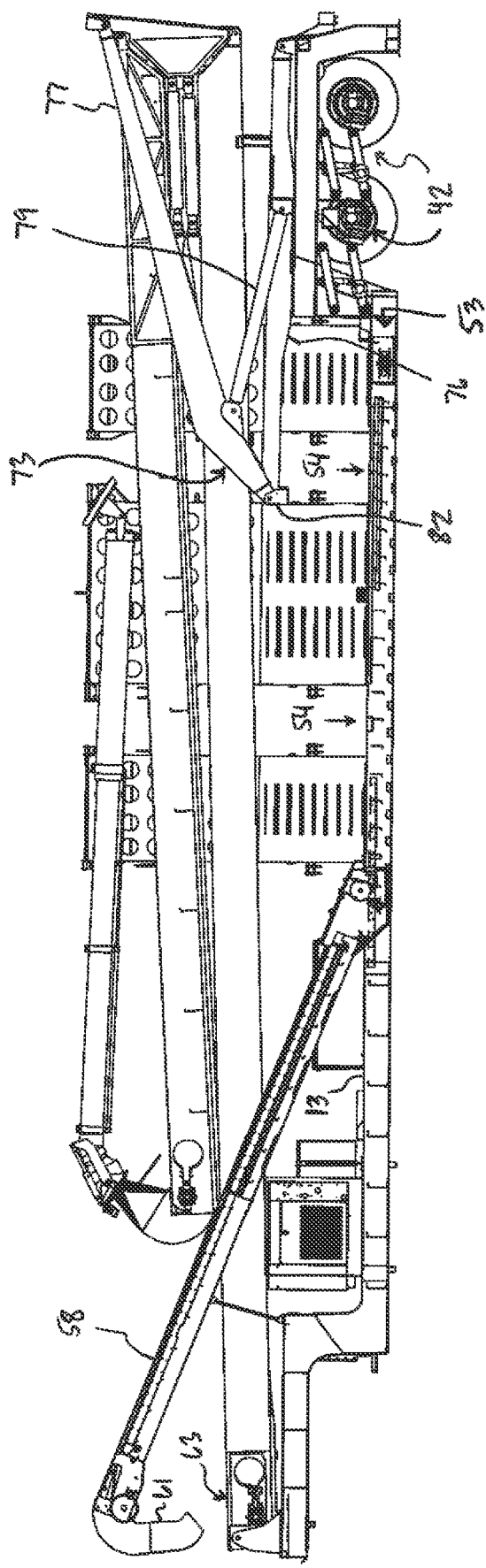
FIG. 4 is a longitudinal cross-sectional view along line 4-4 in FIG. 2.
Figure 5:
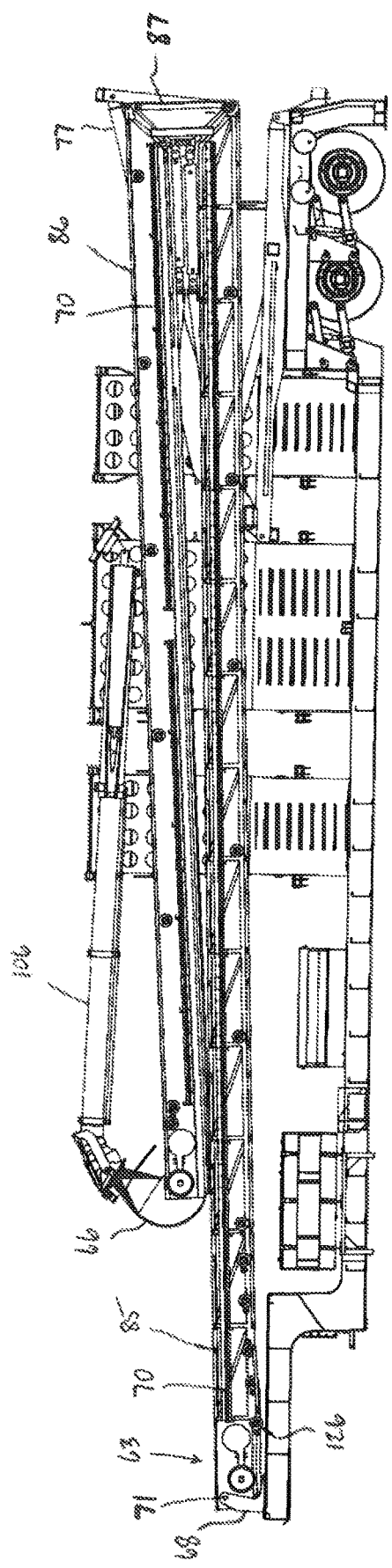
FIG. 5 is a longitudinal cross-sectional view along line 5-5 in FIG. 2.

The figures show a portable drive-over conveyor 10 which is suited for transferring particulate material, such as aggregate, salt, grain, and fertilizer, that is unloaded from a dump truck (not shown) (or, generally speaking, a transport vehicle) and moved from the truck to another location in proximity to the portable drive-over conveyor. For example, this other location may comprise an open area adjacent the portable drive-over conveyor such that the particulate material is simply unloaded into an uncontained stockpile, or this other location may comprise for example a barge, ship, rail car, another trailer, bin, silo, or indoor bulk storage facility. The arrangement shown herein, however, is particularly but not exclusively suited for transferring the particulate material into tall containment structures for which the material needs to be discharged at a sufficient height.

Thus the present disclosure is concerned with the novel configuration for such a portable drive-over conveyor allowing the particulate material to be discharged from a substantial height, that is in the order of tens of feet above the ground, such that components of the drive-over conveyor which are not pertinent to this may be generally discussed herein but are not discussed in significant detail herein.

The portable drive-over conveyor 1 comprises a trailer 4 forming a base of the portable drive-over conveyor.

The trailer may be considered as being collectively formed by three sections, that is a center frame section 6 substantially defining first and second sides 8C and 8D of the trailer, a front frame 9 section defining a front end 8A of the trailer, and a rear frame section 11 longitudinally opposite the front defining a rear end 8B of the trailer.

The center frame section 6 is formed in a manner similar to the portable drive-over conveyor disclosed in US Patent Publication 2016/0052732 to Toews et al. filed 20 Aug. 2014 and incorporated herein by reference, that is by a pair of longitudinal beams (not shown) forming the main structural components. The center frame section includes an upper support surface 13 and a bottom cover panel 15. The cover panel sits on the ground during operation and the beams support the upper surface as would be understood by a person skilled in the art having regard to Toews et al. The top support surface 13 extends along the full length of the center section.

On one side of the center frame section is a first ramp assembly 17 and on the other a second ramp assembly 18 so that the truck to be unloaded can drive over the portable drive-over conveyor entering from one ramp, halting with a discharge of the truck at the center section and then departing over the second ramp.

The first and second ramp assemblies 17, 18 are symmetrically mounted on the respective side for pivotal movement about an axis 20 longitudinal of the first side 8C (or second side 8D) from a raised position standing vertically upwardly above the first side 8C for transport of the portable drive-over conveyor from place to place. When delivered to a required location, the ramp assemblies are lowered to an operating position extending outwardly from the respective side as shown in the figures to define a ramp allowing a truck wheel to move from the ground onto the center frame structure for the delivery process.

Each ramp assembly comprises a plurality of side by side parallel ramp members 24 and 25 which can be raised and lowered by cylinders 26 arranged along the sides of the ramp members and each connected at one end to the respective ramp member and at the opposite end to the side of the center frame 6.

Each ramp includes an inclined upper surface 28 attached at its edges to two triangular sides 29, which may in turn attach to a bottom wall (not shown). The bottom wall or the triangular sides sit on the ground and transfer loads from the vehicle to the ground from the upper surface 28. The ramps and the center frame structure thus provide upper surfaces for supporting the truck as it passes from the first ramp over the center frame structure and onto the second ramp. The ramps 24, 25 are spaced along the side edges of the center section by a space 31 so that any material from the vehicle which does not enter onto the center section for conveying falls to the ground rather than is collected on the ramps.

The center structure 6 has at its front edge 6A a frame component 33 attached to the center frame structure at the forward end so as to extend forwardly therefrom and includes a planar platform 36 generally parallel to the center frame section 6 at a height raised from the center frame structure. The platform 36 is attached to the center structure by a frame connection which is designed to transfer loads during transport from the center section to the platform so that the platform is cantilevered forwardly from the center frame structure 6. The free end of the platform, opposite to that end which is attached to the center frame structure, thus defines the front end 8A of the trailer's overall frame structure.

Underneath the platform is provided a king pin 38 depending from an underside of the front frame for engaging a towing platform of a highway tractor (not shown). As such, the king pin together with the platform define a hitch coupling of the trailer 4.

The frame platform at the frame component connecting to the center section carries conventional jacking legs 39 used on semi-trailers to jack to the ground. The legs 39 which can be moved from a raised position in which the center frame structure rests on the ground to a lowered position in which feet of the legs sit on the ground and lift the center frame structure to be raised from the ground and the towing platform of a highway tractor, defining a towing vehicle, can move underneath the king pin.

The rear frame structure 11 extends rearwardly from the center frame structure at a position thereon raised from a bottom 15 of the center frame structure. The rear frame has a similar structure to the portable drive-over conveyor of the previously mentioned US patent publication 2016/0052732 to Toews et al. and though generally described herein it is thus not illustrated herein. The rear frame 11 includes a pair of parallel beams connected at a forward end to a frame coupling to the center section 6 to transfer loads therebetween. An inner frame defined by a distinct pair of parallel beams located inside the outer beams is pivotal relative to the outer frame on a transverse pivot pin. The inner frame is pivotal by a drive cylinder and can be locked in a lowered position for transport by a locking pin which drives a pin across aligned holes of the beams. The inner frame carries a plurality of wheel and axle assemblies 42 for movement relative to the center frame structure and the outer rear frame from a lowered road position to a raised position allowing the center frame section 6 to rest on the ground. The wheel and axle assembly includes highway tires and a gas bag suspension of the relative to the inner frame which is arranged for highway travel. As such, wheels 42A are rotatably coupled to the trailer so that it is towable across a support surface or roadway by the towing vehicle, such as the highway tractor.

Thus, the ramp assemblies 17, 18 on opposite sides of the trailer in conjunction with the upper surface 13 of the center frame section allow a truck to move from the ground onto the trailer and off the trailer onto the other side thereof. When the truck is positioned with its discharge over the center frame section 6 it is ready for unloading.

In order to transfer the particulate material which is unloaded from a truck to a location off the drive-over conveyor, there is provided a conveyor system 50 formed generally in two stages 51 and 52 which act to move the material in opposite directions along the length of the trailer so as to be able to progressively elevate the unloaded material with each conveyor stage to transport it to a prescribed discharge height suitable for filling a tall containment structure with a height in the order of tens of feet.

The first stage 51 of the system 50 is formed by a first conveyor assembly 51 including a horizontal conveyor section 53 (schematically shown) located beneath the upper surface 13 of the center section 6 whereat an intake 54 of the system 50 is defined. The upper surface 13 of the center frame section 6 thus includes a plurality of rectangular openings 56A and 56B defining inlets of the first conveyor for passage of the particulate material discharged over the respective inlet opening through the upper surface to the first conveyor assembly 51.

The horizontal section 53 extends from a rearmost one of the inlets 56B, which is located closer to the rear end 8B of the trailer than the front end 8A, longitudinally along the center frame section 6 towards a forward end 6A of the center frame. At a location rearwardly of the forward end 6A of the center frame section commences an inclined section 58 of the first conveyor assembly extending in a common longitudinal direction with respect to the horizontal section 53, that is forwardly of the trailer, and also upwardly to a discharge 61 of the first conveyor assembly.

The inclined section 58 extends upwardly above the upper surface 13 of the center frame section and above the front cantilevered platform 36 of the front frame section such that the discharge 61 of the first conveyor assembly is located over the platform 36 at a higher elevation than the intake of the first conveyor assembly, indicated at 54.

The horizontal and inclined sections of the first conveyor assembly may comprise a structure similar to that of the conveyor described in the US patent publication to Toews et al. above such that each section comprises a belt driven by at least one end roller about which the belt wraps.

Thus the first conveyor assembly is driven to transfer the particulate material towards the front end 8A of the trailer in a forward direction therealong illustrated by arrow D1.

At the discharge 61 of the first conveyor assembly is located an intake 63 of a second conveyor assembly 52 of the system 50 so as to be arranged at a transfer discharge of the system 50 where the particulate material is transferred from the first conveyor assembly 51 to the second conveyor assembly. The second conveyor assembly is driven to transfer the particulate material in a rearward direction D2, opposite to that of the first conveyor assembly, towards the rear end 8B of the trailer to a discharge 66 of the overall conveyor system 50.

Figure 7:
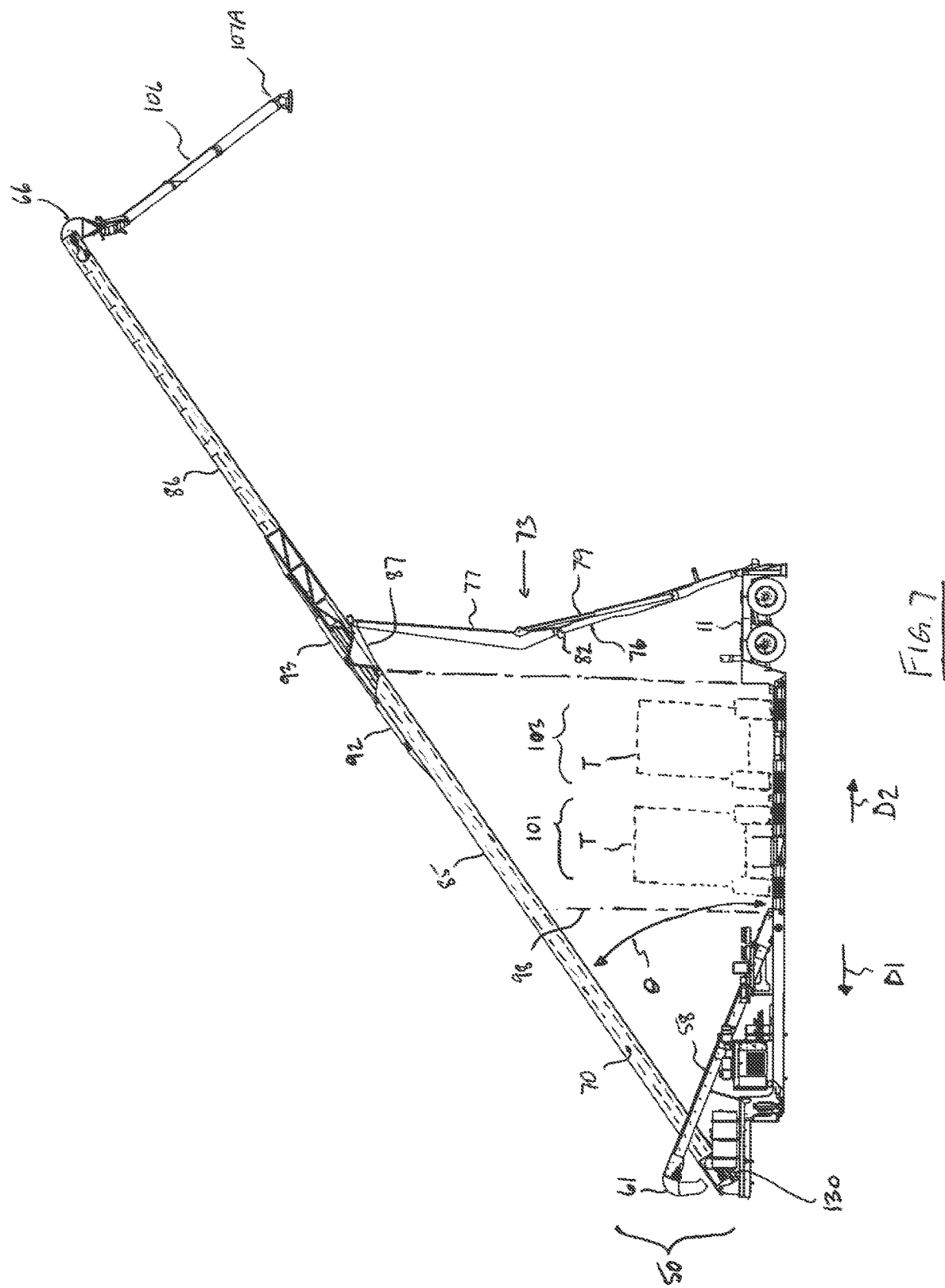
FIG. 7 is a side elevational view of the arrangement of FIG. 1 in an operating position in which a conveyor belt of a second conveyor assembly is shown schematically and in phantom.
Figure 14:
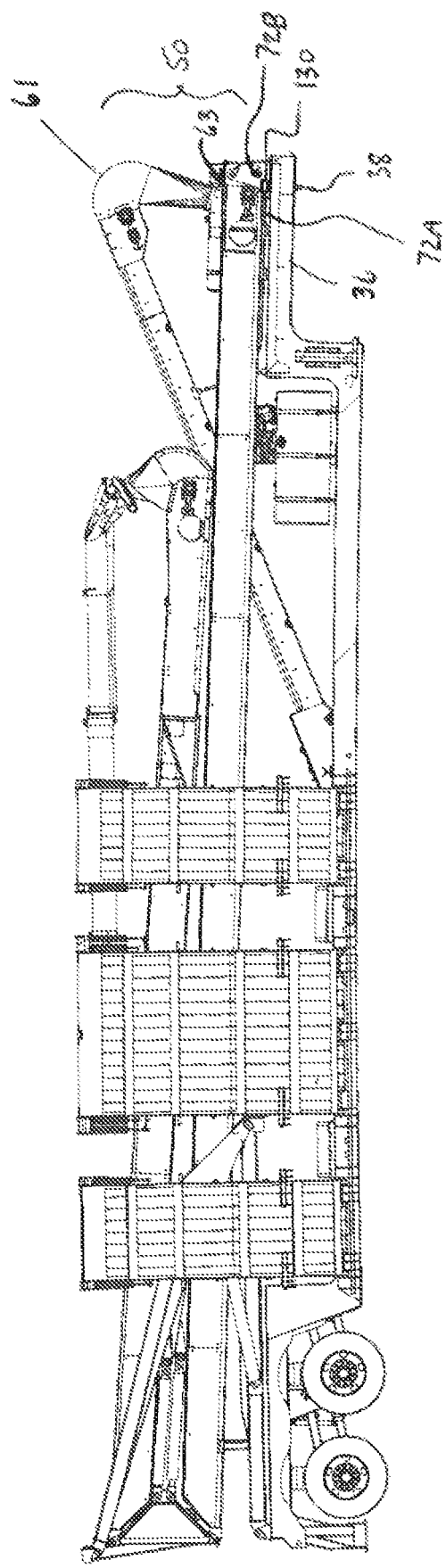
FIG. 14 is a side elevational view of the arrangement of portable drive-over conveyor of FIG. 1 in the transport position.

In an operating position as more clearly shown in FIG. 7, the second conveyor assembly 52 extends from its intake 63 in the rearward direction D2 longitudinally of the trailer and upwardly to the system discharge 66 located at a height H above the transfer discharge 61. The second conveyor assembly is supported at spaced locations along the trailer 4 at the front end at the platform 36 where the intake 63 is located, and at the rear end at the rear frame section 11.

So as to be rendered portable, the second conveyor assembly 52 is supported on the trailer 4 in a manner so as to be retractable from the operating position as in FIG. 7 in which it is inclined relative to the trailer 4 with the system discharge 66 spaced at a height H above the trailer to a stored transport position in FIG. 1 in which the second conveyor assembly is substantially horizontal with the system discharge 66 at an elevation substantially equal to the trailer.

Retractability to the stored position is provided by a pivotal connection at the intake 63 of the second conveyor assembly comprising a base with upstanding ears 68 straddling a conveyor belt 70 of the second assembly 52, and a pivot pin 71 supported on a housing 72 which carries the conveyor belt 70 that is pivotally connected to the respective ear 68 so that the second conveyor assembly can be pivoted upwardly and downwardly about this connection. Furthermore, a hydraulically actuated scissor-style linkage 73 located at the rear end of the trailer is arranged and operable to effect raising and lowering of the second conveyor assembly between the stored and operating positions.

The scissor linkage 73 is generally of a conventional arrangement comprising a pair of pivotally connected arms 76, 77, each on either side of the conveyor, between which a hydraulic cylinder 79 actuator is connected inwardly of their pivotal interconnection at 82 so that the arms can move from a folded position in which one effectively overlies the other to an extended position in which the arms are effectively vertically stacked one on top of the other. The cylinder 79 is pivotally secured to the lower arm 76 of the linkage closer to a base thereof whereat the lower arm is pivotally supported at the rear frame section of the trailer, as compared to the pivotal interconnection 82, and to the upper arm 77 closer to the interconnection 82 to the lower arm than to its distal end where the linkage pivotally supports the housing 72 of the second conveyor assembly.

To achieve greater height while remaining portable so that the drive-over conveyor can be towed on a roadway, the second conveyor assembly comprises a folding conveyor with a first base section 85, a second folding section 86, and an intermediary section 87. The intermediary section 87 is pivotally connected to the base section 85, and the second folding section also pivotally connected to the intermediary section, for pivotal movement of the second conveyor between a folded position like that shown in FIG. 1 and a deployed position shown for example in FIG. 7. In the folded position the folding section 86 lies over on top of the base section 85 with its end defining the system discharge 66 located between opposite ends of the first section, one end defining the intake 63 and the other end adjacent pivot joint 88A of the folding conveyor between the base and intermediary sections. In the folded position of the second conveyor the intermediary section is disposed in substantially transverse orientation, and provides spacing between the base and folding sections so that the latter can be overlaid on top of the former in the folded position. In the deployed position the folding section 86 and intermediary section 87 are substantially linearly aligned with the base section so as to form a continuation of the conveyor belt of the base section extending therebeyond generally in a common direction.

Each of the base 85 and folding 86 sections of the second conveyor assembly are significantly greater in length than the intermediary section which acts as a bridge therebetween. In the illustrated arrangement, the first base section 85 is approximately equal in length to the trailer, and the second folding section 86 is shorter in length than the base section.

Actuation between the folded and deployed positions is provided by separate sets of hydraulic cylinder actuators 92, 93 distinct from those at 79 operating the scissor linkage 73. A first set of the cylinders indicated at 92 are operatively connected between the first base section 85 and the intermediary section 87, where the cylinders 92 are pivotally connected at a location which is intermediate first and second pivot joints 88A and 88B. The second pivot joint 88B is formed between the intermediary section 87 and the folding section 86. A second set of the cylinder indicated at 93 are operatively connected between the intermediary section 87 and the folding section 86, with pivotal connection of these cylinders 93 to the intermediary section also being intermediate the two pivot joints 88A and 88B. Both sets of cylinders 92 and 93 are oriented in a common direction along the second conveyor, such that when the second conveyor assembly is in the deployed position the extending direction of both sets of cylinders is upward towards the discharge 66.

Figure 6:
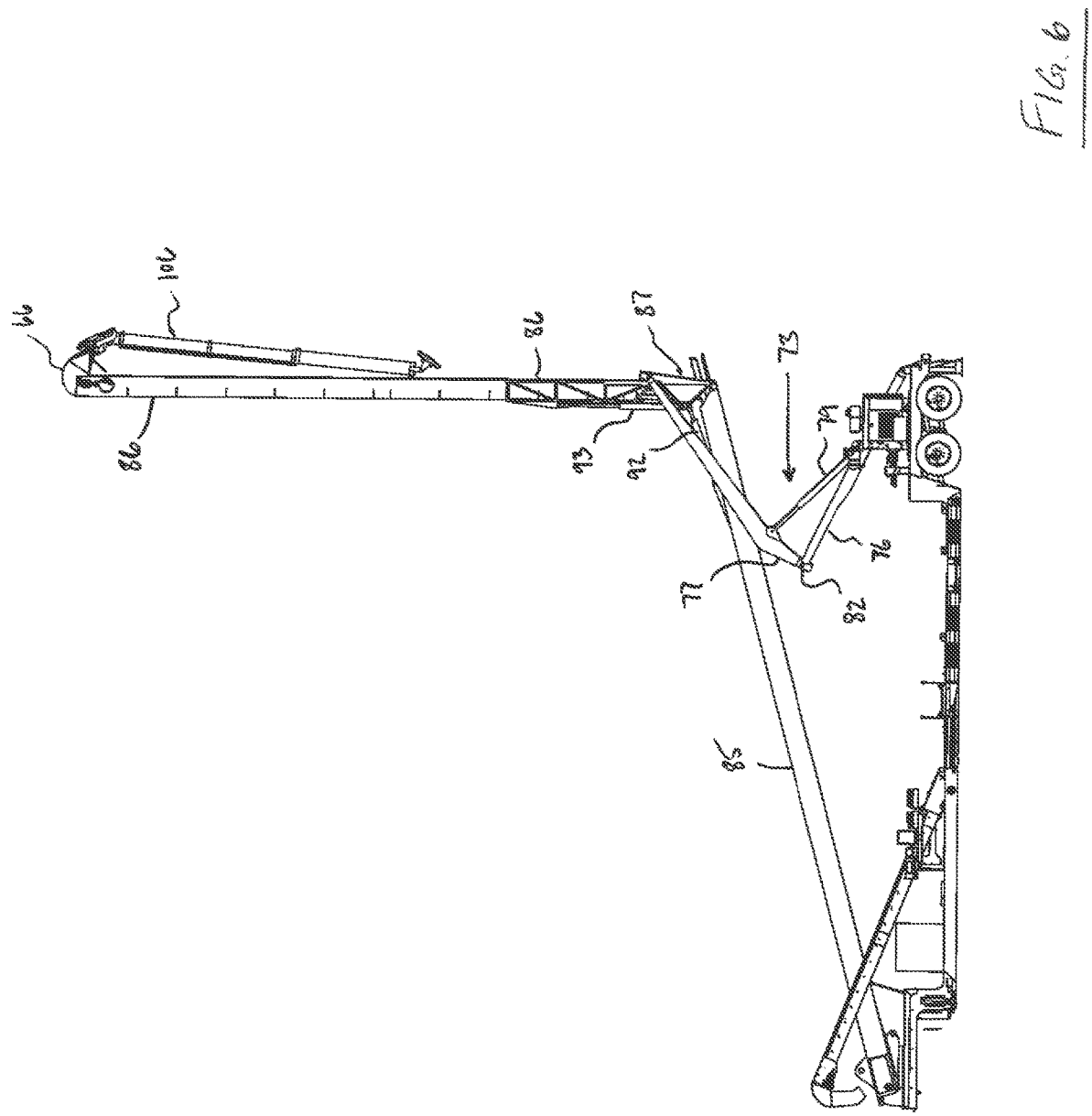
FIG. 6 is a side elevational view of the arrangement of FIG. 1 in a position intermediate the transport position, as shown in FIG. 1, and an operating position as shown in FIG. 4. Some components are omitted for clarity of illustration.

Folding occurs in two stages, one in which the folding section 86 is brought into linear alignment with the intermediary section by actuation of cylinder set 93 in the extension direction, and another in which the intermediary section 87 is brought into linear alignment with the base section 85. In the figures, deployment of the second conveyor assembly is illustrated in FIGS. 6 and 7 in which, first, the folding section 86 is linearly aligned with the intermediary section and then these are brought into linear alignment with the base section 85.

The scissor linkage 73 is pivotally coupled to a framework of the second conveyor assembly at the intermediary section 87 at a pivot joint 94 distinct from pivot joints 88A, 88B. In the illustrated arrangement, this framework is defined by housing 72 of the second conveyor assembly. The scissor pivot joint 94 is located outwardly of the pivot joint 88B between the folding 86 and intermediary 87 sections so as to be located in a separate imaginary plane containing the pivot joints 88A and 88B and outside of ends of the intermediary section defined by the pivot joints 88A, 88B.

Hydraulic lines and pumps with motors are provided mounted on the trailer, a portion 95A thereof on the front frame section 9 and a portion 95B on the center frame section 6, for driving the hydraulics including those for the conveyors, the linkage 73, and the ramp assemblies 17 and 18.

Since the inclined section 58 of the first conveyor assembly and the second conveyor assembly 52 span a common portion of the length of the trailer and an end portion of the inclined section adjacent the transfer discharge 61 is at a height greater than an initial portion of the second conveyor assembly adjacent its intake, the inclined section and the base section 85 of the second assembly 52 are located in side-by-side relation so that one does not obstruct the other. Further, the second conveyor assembly 52 may be raised and lowered clear of the inclined section 58 without it obstructing a pivotal range of movement between stored and operating positions.

The first conveyor assembly including the horizontal section 53 and inclined section 58 and the inlets 56 to the first conveyor are offset from a transverse center of the trailer 4 so as to be closer towards one side 8C of the trailer than the other 8D. Thus, the second conveyor assembly is not located over the inlets 56 to the first conveyor assembly, but rather these are substantially in side-by-side relation.

In the illustrated arrangement the inclined section 58 extends strictly forwardly of the trailer while the second conveyor assembly 52 extends slightly transversely to the forward direction so that the system discharge 66 is located closer to a lateral center of the trailer 4 than if the second conveyor assembly were to extend strictly rearwardly of the trailer.

The second conveyor assembly 52 spans at least the full length of the trailer 4 from a location at the front to a location at the rear (appreciating that in the illustrated arrangement the second assembly in the deployed position extends horizontally past the rear end 8B in the rearward direction D2) and is located vertically over the trailer 4. Thus, as shown in FIG. 7, in the operating position of the second conveyor assembly it is arranged by the linkage 73 at a prescribed location where the second conveyor assembly is at a height at least equal to a height of truck T over the upper surface 13 of the trailer where the intake 54 is located enabling the trucks T (shown in phantom) to move from the support surface across one of the ramp assemblies 17 or 18 and onto the trailer for unloading.

A clearance opening is therefore formed indicated at 98 in stippled lines which is defined at a top by the second conveyor assembly 52, at a bottom by the center frame section 6, at a forward end forwardly of a forward-most lane 101 across which a truck can drive and unload at a corresponding forward-most inlet 56A by the second conveyor assembly, and at a rear end rearwardly of the rearward-most lane 103 across which a truck can drive and unload in at a corresponding rear-most inlet 56B by the rear frame section 11. Where the clearance opening 98 is considered trapezoidal in shape it is sized in height at the lowest point at the top of the trapezoid to be at least slightly taller in height than a conventional semi-trailer towable behind a tractor trailer. Rearwardly of this point the second conveyor assembly extends upwardly and therefore vertical clearance between same and the upper surface of the center frame section is sufficient. To provide for the clearance opening the second conveyor assembly thus is supported to the front of and to the rear of the inlets 56A and 56B which are with respect to the longitudinal direction located centrally of the trailer 4.

To provide sufficient height clearance when the intake 63 of the second conveyor assembly is located at an end of the trailer it is inclined in the second direction of conveyance and upwardly at a prescribed angle θ relative to the horizontal of 35 degrees which is in a range of suitable angles between 25 degrees and 45 degrees, or between 30 degrees and 40 degrees, depending on distance between the inlets and the start of the second conveyor assembly and on a height of the trailer, though the latter is fairly standardized.

When fully unfolded so as to have the base 85, intermediary 87, and folding sections 86 linearly aligned, in the illustrated arrangement the second conveyor assembly 52 locates the system discharge 66 at a prescribed height H above the ground surface of about 66 to 67 feet which is in a range of suitable heights between 60 and 75 feet, or between 65 and 70 feet.

Typically the system discharge 66 is located several feet above a fill opening of a storage containment structure S and thus in the illustrated arrangement there is provided a discharge chute 106 at the system discharge of the conveyor system for guiding the particulate material by gravity away therefrom to a desired outside location. The chute 106 is pivotally attached to the second conveyor assembly 52 so that an end 107A of the chute distal to the conveyor is positionable angularly of a radial direction of the second conveyor assembly 52.

A tubular body 108 of the chute is connected so as to be cantilevered from a pivotal elbow 109 which is arranged for tilting pivotal movement about an axis T transverse to an upstanding axis U at the system discharge 66. The elbow comprises a collar 111 which is mounted in fixed pivotal relation to the system discharge 66, and a sleeve 112A carried by a pivotal frame 112B in a position encircling the collar 111 in overlapping relation. The pivotal frame is formed by a pair of J-shaped support members 113A coupled to the sleeve on either side thereof, and by a pair of brackets 113B mounted to the collar 111 that are pivotally connected to upper ends of the J-shaped members whereat the transverse axis T is defined. The pivotal frame 112B is connected to a pair of hydraulic cylinder actuators 114 defining linear actuators which can adjust position of the sleeve around the downwardly opening collar 111 so as to vary an angle of the chute 106 to the vertically oriented upstanding axis U. A portion of the pivotal frame 112B connected to the J-shaped support members 113A extends circumferentially about the sleeve from one side thereof to the other so as to support the sleeve thereunder when oriented at an angle to the upstanding axis U. Also, the brackets 113 extend from the axis T towards upper base ends of the cylinder actuators 114 for pivotal support thereof, and the J-shaped members 113A are pivotally connected to lower piston-rod ends of the cylinder actuators 114.

The elbow 109 also is rotatably supported at the discharge 66 with its collar 111 rotatably coupled to the discharge, at which lower terminus is defined the opening through which material exits the second conveyor assembly. A motorized carrier 115 is cantilevered at a fixed external location from the discharge 66 and is operatively connected to an annular track 117 connected to the collar 111 and encompassing same. Thus the carrier 115 is arranged to traverse the track 117 so as to rotate the collar 111 and the pivotal frame 112B connected in fixed swiveling relation thereto (with respect to the upstanding axis U), thus rotating the elbow, so that the chute 106 is rotatable about the upstanding axis U in swiveling pivoting movement. Thus, the elbow is supported by the carrier in suspension from the track. Furthermore, transfer of material from the discharge 66 to the chute is not obstructed by the track 117.

The chute's body 108 is formed by a plurality of elongated cylindrical sections 120 with ends of the sections held in an overlapped arrangement. The sections 120 are connected together by a linking strut 121 extending in a longitudinal direction of the chute body 108. A plurality of annular clamps 123 are located at spaced positions along the chute body and connect to the linking strut 121. The linking strut of the illustrated arrangement has adjustable length and thus includes a plurality of telescoping sections 124A, 124B. As such, the chute comprises a telescopic configuration allowing for a length of the chute to be adjusted.

The adjustability for location of the discharge chute's distal end 107A, particularly as provided by the elbow and carrier on the annular track, allows for the portable drive-over conveyor to remain parked and from this single parked location be capable of filling multiple silos which have fill openings spaced from one another. For example, a conventional configuration of silos storing fracking proppants is referred to as a six-pack configuration, in which the silos are arranged in two rows each comprising three silos and separated from the other by a conveyor oriented to deliver the proppants from the silos to a container for blending. The illustrated arrangement of portable drive-over conveyor is able to fill each silo of the six-pack from a single parked location.

A camera C (schematically shown) is provided in the vicinity of the discharge 66 of the conveyor system to generate visual images of the discharge chute's distal end 107A so that images of this distal chute end can be viewed on a monitor M of a control panel CP (both schematically shown), to which the camera is operatively connected, mounted on the trailer at ground level. An operator controls all operational aspects of the portable drive-over conveyor from this control panel, including position of the distal discharge chute end 107A. Thus the camera feeding to the monitor M the visual images captured through its lens L allows for the operator at ground level to suitably position the end 107A of the discharge chute, wherefrom the material exits by gravity, at a fill opening of a storage silo which is located tens of feet above ground level.

In the illustrated arrangement the camera C is mounted on an outer surface of the sleeve 112A of the elbow which rotates around the depending collar 111 and is fixed in relation to the chute body 108 so that the camera C is oriented in a manner for its lens L to follow movement of the distal chute end 107A. The camera is located on a side of the rotatable sleeve 112A that is opposite to the cylinder actuators 114, which in operation are located at a rear or inner side of the sleeve 112A proximal to the second conveyor assembly.

Each of the inclined section 58 of the first conveyor assembly and the second conveyor assembly 52 are enclosed around their transverse periphery encircling a respective direction of material transfer by a housing 124, 72 so as to contain dust generated during transferring of the particulate material. The transfer discharge 61 at the terminus of the inclined section 58 extends downwardly and towards that side 8D of the trailer on which the second conveyor assembly 52 is located so as to guide the particulate material by gravity into the intake 63. Thus a bottom discharge opening 61A of the transfer discharge 61 is located above the second assembly's intake 63, which is located in the order of 5-8 feet above the intake of the first assembly, and the system discharge is located 50-60 feet above the transfer intake such that the second conveyor assembly 52 is that portion of the conveyor system 50 which moves the particulate material to the desired height while the first conveyor assembly 51 moves the particulate material from a suitable central unloading location to one end of the trailer where the intake of the second conveyor assembly is located.

The second conveyor assembly comprises a common endless belt conveyor 70 spanning the full length of the second conveyor assembly from intake 63 to discharge 66 so as to span from the base section 85 where one end of the belt wraps from lower to upper run across the intermediary section 87 to the folding section 86 where the other end of the belt wraps from upper to lower run, which sections 85 and 86 are contained within enclosed housing 72. The conveyor belt 70 carries a plurality of upstanding cleats 125 (schematically shown) which stand upwardly from the belt 70 so as to provide a leading support surface 125A, relative to a transfer direction TD of the second conveyor assembly in which the material is conveyed from intake to discharge, extending transversely from an outer surface 70A the conveyor belt so as to be upstanding relative thereto. The cleats are arranged at spaced locations along the belt 70 relative to the transfer direction TD and across a width of the belt transverse to the transfer direction. In FIG. 12 only select ones of the cleats 125 are shown (in phantom) for clarity of illustration. It is the leading support surfaces 125A of the cleats against which the material rests so as to be carried up at the incline of the deployed second conveyor assembly against gravity. The cleats stand upwardly from the outer surface 70A of the belt at a height of 2 inches.

There are provided rollers 126 located at least at or adjacent either lower intake and upper discharge end of the belt and at each section of the folding conveyor, operatively connected to each section for rotation about its respective roller axis, about which the belt 70 wraps forming an upper run 127A and lower return run 127B. At least one of the rollers is driven by a motor such as at 129 so that the belt is circulated in its path to convey the material. The belt conveyor 70 has a downwardly-concave shaped upper run so that an upper surface of the upper run 127A (that is defined by the outer surface 70A) is downwardly-concave shaped, as more clearly shown in FIG. 13, and is of a similar construction as the conveyor belt of the first conveyor assembly. In the event the discharge 66 of the second conveyor assembly becomes obstructed, for example due to clogging of the discharge chute 106, so as to cause material to move along a lower run of the second conveyor assembly back towards the intake 63, there is provided an overfill dump gate 130 in the form of a pressure plate attached to an underside of the housing 72, which in the illustrated arrangement forms an enclosure of the second conveyor assembly, at a location beneath the intake 63 and below a lowest end of the conveyor belt 70 of base section 85. The gate 130 cooperates with a material escape opening 132 formed in an underside portion 72A of the housing which spans substantially from one side of the conveyor belt 70 below the belt and to the other side, preventing material which falls off the upper run of the belt 70 from falling onto operators or other machinery beneath the second conveyor assembly. The gate is configured to be movable relative to the escape opening from a closed position relative to the escape opening in which the gate spans across the opening to cover same to an open position of the gate relative to the escape opening, once a threshold weight of material has collected on the gate so as to cause it to operate to move to the open position in which the opening is unobstructed to allow release of collected material from within the housing 72. This material collecting on an interior surface 72B of the underside portion 72A of the housing at the lower end of the second conveyor assembly may cause damage to the second conveyor assembly once a sufficient amount of the material accumulates, and thus the gate in the form of a pressure plate allows selective release of accumulated material to prevent damage to components. The forward platform 36 comprises a passage opening 135 beneath the material escape opening/dump gate so that any material released from the second conveyor assembly passes through the passage opening 135 and is dumped onto the ground. In the illustrated arrangement the passage opening 135 is defined by longitudinally and laterally oriented cross members of the forward frame section arranged to form a rectangular opening in the forward section beneath the dump gate 130. The dump gate is spaced from an outer periphery from a support plate 38A carrying the king pin 38 so as to be disposed at a location offset therefrom, allowing material to fall onto the ground clear of the hitch coupling.

In the illustrated arrangement the first conveyor assembly defines a feeder conveyor of the portable drive-over conveyor, the second conveyor assembly defines a main conveyor of the portable drive-over conveyor, and the trailer substantially defines a transportable frame of the portable drive-over conveyor. Furthermore, the inlet openings 56A, 56B in the upper surface are located in a vehicle discharge area of the transportable frame that is adapted for supporting the transport vehicle in movement across the upper surface of the transportable frame. It will also be appreciated that the intake 63 of the main conveyor is located in communication with the transfer discharge 61 of the feeder conveyor so as to receive the material conveyed by the feeder conveyor. Yet further, each of the intake 54 and discharge 61 of the feeder conveyor and the intake 63 of the main conveyor are located within a periphery of the transportable frame defined by the forward end 8A, rear end 8B, and first and second sides 8C and 8D of the transportable frame. Moreover, in the illustrated arrangement the sleeve 112A and J-shaped support members 113 collectively define a first support framework pivotally connected to a second support framework, which is defined by collar 111 and brackets 113B, and attached to the second conveyor assembly such that there is defined a transverse axis about which the chute 106 is driven by the cylinder actuators 114 in pivotal movement to raise and lower the distal end 107A of the chute.

The scope of the claims shall not be limited by the preferred embodiments set forth in the examples, but shall be given the broadest interpretation consistent with the description as a whole.

The invention claimed is:
1. A portable drive-over conveyor for unloading particulate material from a truck comprising:

a trailer with front and rear ends longitudinally opposite one another and first and second sides;

the trailer including a hitch coupling supported at the front end for coupling to a towing vehicle;

the trailer including a plurality of wheels rotatably coupled in proximity to the rear end such that the trailer is towable across a support surface by the towing vehicle;

a conveyor system carried by the trailer for transferring the particulate material received from the truck to a discharge of the conveyor system wherefrom the particulate material exits the portable drive-over conveyor so as to be transferred to an outside location with respect to the portable drive-over conveyor;

a first ramp assembly mounted on the first side for pivotal movement about an axis longitudinal of the first side such that the first ramp assembly is positionable in a manner extending outwardly from the first side to define a ramp allowing one of the truck wheels to move onto the trailer from another surface;

a second ramp assembly mounted on the second side for pivotal movement about an axis longitudinal of the second side such that the second ramp assembly is positionable in a manner extending outwardly from the second side to define a ramp allowing one of the truck wheels to move onto the trailer from another surface;

the ramp assemblies and the trailer providing upper surfaces for supporting the truck as it passes from the first ramp assembly over the trailer and onto the second ramp assembly;

the conveyor system including a first conveyor assembly having an intake beneath the upper surface of the trailer such that the upper surface of the trailer includes an inlet for passage of the particulate material discharged thereon through the upper surface to the first conveyor assembly;

the first conveyor assembly extending from the intake in a direction from one end of the trailer towards the other to a transfer discharge of the first conveyor assembly so that the particulate material is conveyed in a first direction therealong;

the conveyor system including a second conveyor assembly with an intake arranged at the transfer discharge of the first conveyor assembly so as to receive the particulate material therefrom, the second conveyor assembly in an operating position extends from its intake in a second direction opposite to the first direction and upwardly to a discharge defining the discharge of the conveyor system which is located at a higher elevation than the transfer discharge of the first conveyor assembly, and wherein in a stored position the second conveyor is substantially horizontal with the discharge at an elevation substantially equal to the trailer.

2. The portable drive-over conveyor of claim 1 wherein the first conveyor assembly extends both in the first direction and upwardly to the transfer discharge which is located at a higher elevation than the intake of the first conveyor assembly.

3. The portable drive-over conveyor of claim 1 wherein the first conveyor assembly is driven to transfer the particulate material towards the front end of the trailer, and the second conveyor assembly is driven to transfer the particulate material towards the rear end of the trailer.

4. The portable drive-over conveyor of claim 1 wherein the hitch coupling comprises a king pin depending from a cantilevered platform extending forwardly from the front end of the trailer, and the intake of the second conveyor assembly is located on the platform.

5. The portable drive-over conveyor of claim 1 wherein the first conveyor assembly and the second conveyor assembly are located in side-by-side relation.

6. The portable drive-over conveyor of claim 1 wherein the inlet to the first conveyor assembly is offset from a transverse center of the trailer so as to be located closer to one of the first and second sides than to the other.

7. The portable drive-over conveyor of claim 1 wherein the second conveyor assembly is supported on the trailer so as to be retractable from an operating position in which it is inclined relative to the trailer with the discharge of the conveyor system spaced at a height above the trailer to the stored position.

8. The portable drive-over conveyor of claim 1 wherein the second conveyor assembly comprises a folding conveyor with a first section supported on the trailer, an intermediary section pivotally connected to the first section, and a second section pivotally connected to the intermediary section for pivotal movement between a folded position in which the second section lies over on top of the first section with its end distal to connection with the intermediary section located between opposite ends of the first section, and a deployed position in which the intermediary section and the second section form a continuation of the first section extending therebeyond generally in a common direction.

9. The portable drive-over conveyor of claim 1 wherein the conveyor system is substantially enclosed around its transverse periphery encircling a respective direction of material transfer so as to contain dust generated during transferring of the particulate material.

10. The portable drive-over conveyor of claim 1, in combination with the truck, wherein at least a portion of the second conveyor assembly is supported at a height over the upper surface of the trailer at least substantially equal to a height of the truck so as to enable the truck to move from the support surface across one of the ramp assemblies and onto the trailer, under the second conveyor assembly, for unloading.

11. The portable drive-over conveyor of claim 1 wherein the second conveyor assembly is supported by scissor-style linkage at the rear end of the trailer.

12. The portable drive-over conveyor of claim 1 wherein there is a plurality of inlets in the upper surface of the trailer such that more than one truck can be simultaneously positioned each over one of the inlets for unloading.

13. The portable drive-over conveyor of claim 1 wherein the second conveyor assembly is inclined in the second direction and upwardly at a prescribed angle relative to the horizontal in a range between 25 degrees and 45 degrees.

14. The portable drive-over conveyor of claim 1 wherein the second conveyor assembly is inclined in the second direction and upwardly at a prescribed angle relative to the horizontal in a range between 30 degrees and 40 degrees.

15. The portable drive-over conveyor of claim 1 wherein the discharge of the conveyor system is located at a prescribed height above the support surface which is in a range between 60 and 75 feet.

16. The portable drive-over conveyor of claim 1 further including an overfill dump gate operable to move from a closed position covering an opening formed in an underside portion of an enclosure of the second conveyor assembly at or adjacent a lower end thereof near the intake of the second conveyor assembly, to an open position relative to the opening so as to allow material collected at the lower end of the second conveyor assembly below the intake to be released from the enclosure of the second conveyor assembly.

17. The portable drive-over conveyor of claim 1 further comprising a chute at the discharge of the conveyor system for guiding the particulate material by gravity away therefrom to a desired outside location, the chute being pivotally attached to the second conveyor assembly so that an end of the chute distal to the conveyor system is positionable angularly of a radial direction of the second conveyor assembly relative to the discharge of the second conveyor assembly.

18. The portable drive-over conveyor of claim 17 wherein the chute is carried on an annular track encompassing an opening of the discharge of the conveyor system for rotational movement of the chute relative to the discharge in a manner so that transfer of material from the discharge to the chute is not obstructed.

19. The portable drive-over conveyor of claim 17 wherein the chute is supported on a first support framework pivotally connected to a second support framework attached to the second conveyor assembly to define a transverse axis about which the chute is driven in pivotal movement to raise and lower the distal end of the chute.

20. A portable drive-over conveyor for unloading particulate material from a transport vehicle comprising:
   a transportable frame extending in a longitudinal direction from a forward end of the transportable frame to a rear end thereof and having first and second sides of the transportable frame spanning therebetween;
   a hitch coupling connected to the transportable frame for connection of the transportable frame to a tow vehicle and a plurality of wheels rotatably coupled to the transportable frame for supporting the transportable frame in rolling movement across a support surface, such that the transportable frame is towable across the support surface;
   first and second ramp assemblies respectively connected to the first and second sides of the transportable frame and extending laterally outwardly therefrom in an operating position of the first and second ramp assemblies in which the first and second ramp assemblies respectively provide an inclined upper surface extending downwardly from a height of an upper surface defined on the transportable frame to a respective distal end of the respective one of the first and second ramp assemblies so that a wheel of the transport vehicle can move from the support surface to the upper surface of the transportable frame;
   a feeder conveyor carried by the transportable frame with an intake of the feeder conveyor located below the upper surface of the transportable frame;
   an opening in the upper surface of the transportable frame to allow passage of the material from a discharge of the transport vehicle through the opening in the upper surface of the transportable frame and to the feeder conveyor, the opening being located in a vehicle discharge area of the transportable frame adapted for supporting the transport vehicle in movement across the upper surface of the transportable frame;
   the feeder conveyor including a discharge of the feeder conveyor spaced in a first longitudinal direction from the intake of the feeder conveyor and located within a periphery of the transportable frame collectively defined by the forward end and the rear end and the first and second sides, the feeder conveyor being operable to convey the material in the first longitudinal direction along the transportable frame once discharged from the transport vehicle;
   a main conveyor carried by the transportable frame with an intake of the main conveyor located in communication with the discharge of the feeder conveyor so as to receive the material conveyed by the feeder conveyor;
   the main conveyor including a discharge of the main conveyor which in an operating position of the main conveyor is elevated above the intake of the feeder conveyor and spaced therefrom in a second longitudinal direction opposite to the first longitudinal direction, the main conveyor being inclined upwardly and in the second longitudinal direction from the intake of the main conveyor to the discharge thereof and operable to convey the material along the transportable frame in the second longitudinal direction once received from the feeder conveyor;
   at least a portion of the main conveyor which extends from the intake of the main conveyor towards the discharge thereof being located vertically above the vehicle-discharge area of the transportable frame at a height adapted to allow passage of the transport vehicle under the main conveyor.

21. A portable drive-over conveyor for unloading particulate material from a transport vehicle comprising:
   a transportable frame extending in a longitudinal direction from a forward end of the transportable frame to a rear end thereof and having first and second sides of the transportable frame spanning therebetween;
   a hitch coupling connected to the transportable frame for connection of the transportable frame to a tow vehicle and a plurality of wheels rotatably coupled to the transportable frame for supporting the transportable frame in rolling movement across a support surface, such that the transportable frame is towable across the support surface;
   first and second ramp assemblies respectively connected to the first and second sides of the transportable frame and extending laterally outwardly therefrom in an operating position of the first and second ramp assemblies in which the first and second ramp assemblies respectively provide an inclined upper surface extending downwardly from a height of an upper surface defined on the transportable frame to a respective distal end of the respective one of the first and second ramp assemblies so that a wheel of the transport vehicle can move from the support surface to the upper surface of the transportable frame;
   a feeder conveyor carried by the transportable frame with an intake of the feeder conveyor located below the upper surface of the transportable frame;
   an opening in the upper surface of the transportable frame to allow passage of the material from a discharge of the transport vehicle through the opening in the upper surface of the transportable frame and to the feeder conveyor, the opening being located in a vehicle discharge area of the transportable frame adapted for supporting the transport vehicle in movement across the upper surface of the transportable frame;
   the feeder conveyor being operable to convey the material discharged from the transport vehicle to a discharge of the feeder conveyor which is spaced in a longitudinal direction, with respect to the transportable frame, from the intake of the feeder conveyor;

a main conveyor carried by the transportable frame with an intake of the main conveyor located in communication with the discharge of the feeder conveyor so as to receive the material conveyed by the feeder conveyor;

the main conveyor being operable to convey the material once received from the feeder conveyor to a discharge of the main conveyor which in an operating position of the main conveyor is elevated above the intake of the feeder conveyor;

the main conveyor, in the operating position, extending upwardly and in a longitudinal direction of the transportable frame from the intake of the main conveyor to the discharge thereof such that the main conveyor is inclined in the operating position, wherein at least a portion of the main conveyor is located vertically above the vehicle-discharge area of the transportable frame at a height adapted to allow passage of the transport vehicle under the main conveyor;

the main conveyor comprising a folding conveyor including a first section defining the intake of the main conveyor, a second section pivotally connected to the first section at a first pivot joint defining a pivot axis transversely oriented with respect to the transportable frame, and a third section defining the discharge of the main conveyor, the third section being pivotally connected to the second section at a second pivot joint defining a pivot axis transversely oriented with respect to the transportable frame, such that the second and third sections are movable relative to the first section by actuators operatively coupled to the second and third sections from the operating position in which the first, second, and third sections are disposed so that the material is transferable from the intake of the main conveyor along each one of the sections to the discharge of the main conveyor to a folded condition of the folding conveyor in which the third section is disposed substantially overlying the first section;

the folding conveyor including a common endless conveyor belt wrapping around a plurality of rollers one of which is connected to the first section and another one of which is connected to the third section so as to be arranged to span from the first section across the second section to the third section of the folding conveyor to convey the material in a transfer direction along the main conveyor in the operating position;

the conveyor belt supporting a plurality of upstanding cleats defining leading support surfaces extending transversely from an outer surface of the conveyor belt at spaced locations with respect to the transfer direction of the main conveyor against which the material conveyed by the main conveyor is rested so as to be carried up the incline against gravity.

* * * * *